US010907707B2

(12) United States Patent
Baric et al.

(10) Patent No.: US 10,907,707 B2
(45) Date of Patent: Feb. 2, 2021

(54) BELT TENSIONING METHOD

(71) Applicant: Parker-Hannifin Corporation, Cleveland, OH (US)

(72) Inventors: Thomas Baric, Trafford, PA (US); Mike Bridges, Monroeville, PA (US); Adis Halimic, Cheswick, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/364,480

(22) Filed: Mar. 26, 2019

(65) Prior Publication Data

US 2019/0219138 A1 Jul. 18, 2019

Related U.S. Application Data

(62) Division of application No. 14/891,508, filed as application No. PCT/US2014/038627 on May 19, 2014, now Pat. No. 10,267,393.

(Continued)

(51) Int. Cl.
*F16H 19/00* (2006.01)
*F16H 19/06* (2006.01)
*F16C 29/04* (2006.01)

(52) U.S. Cl.
CPC ........ *F16H 19/0672* (2013.01); *F16C 29/045* (2013.01); *F16C 2322/39* (2013.01);
(Continued)

(58) Field of Classification Search
CPC ......... F16H 19/0672; F16H 2019/0681; F16H 2019/0686; F16H 19/06
(Continued)

(56) References Cited

U.S. PATENT DOCUMENTS 5,234,386 A 8/1993 Nagai
5,819,584 A * 10/1998 Evans .................... F16H 19/06
74/89.21

(Continued)

FOREIGN PATENT DOCUMENTS

DE 37 39 272 A1 6/1989
EP 0160923 A1 11/1985
(Continued)

OTHER PUBLICATIONS

International Search Report and Written Opinion for corresponding patent application No. PCT/US2014/038627 dated Nov. 20, 2014.
(Continued)

*Primary Examiner* — Victor L MacArthur
(74) *Attorney, Agent, or Firm* — Renner, Otto, Boisselle & Sklar, LLP

(57) ABSTRACT

Provided is an actuator, preferably a linear actuator, including a carriage having a lateral support surface for supporting a first longitudinal section of a belt against lateral deflection and a space adjacent to and longitudinally offset from the lateral support surface for partially surrounding a second longitudinal section of the belt that is deflected relative to the lateral support surface to take up slack and/or tension the belt. By containing the slack within the carriage using the space and the lateral support surface, slack may be removed from the belt or the belt may be tensioned in an easy and cost efficient manner.

19 Claims, 9 Drawing Sheets

Related U.S. Application Data

(60) Provisional application No. 61/824,556, filed on May 17, 2013, provisional application No. 61/879,924, filed on Sep. 19, 2013.

(52) U.S. Cl.
CPC ............... *F16H 2019/0681* (2013.01); *F16H 2019/0686* (2013.01)

(58) Field of Classification Search
USPC .................................................. 74/37, 89.2
See application file for complete search history.

(56) References Cited

U.S. PATENT DOCUMENTS

| | | |
|---|---|---|
| 7,220,198 B2 | 5/2007 | Iida |
| 7,867,120 B2 | 1/2011 | Keller et al. |
| 8,590,113 B2 | 11/2013 | Moyer |
| 2004/0065162 A1* | 4/2004 | Iida .......................... F16H 7/08 74/89.2 |
| 2007/0234832 A1 | 10/2007 | Iida |
| 2011/0051202 A1 | 3/2011 | Hirokawa et al. |
| 2011/0271778 A1 | 11/2011 | Bauer et al. |

FOREIGN PATENT DOCUMENTS

| | | |
|---|---|---|
| JP | S62 99178 A | 5/1987 |
| JP | S63 57272 A | 3/1988 |

OTHER PUBLICATIONS

Parker-Hannifin Corporation, HPLA Series Belt Driven Linear Modules, pp. 200-213 (2009).

\* cited by examiner

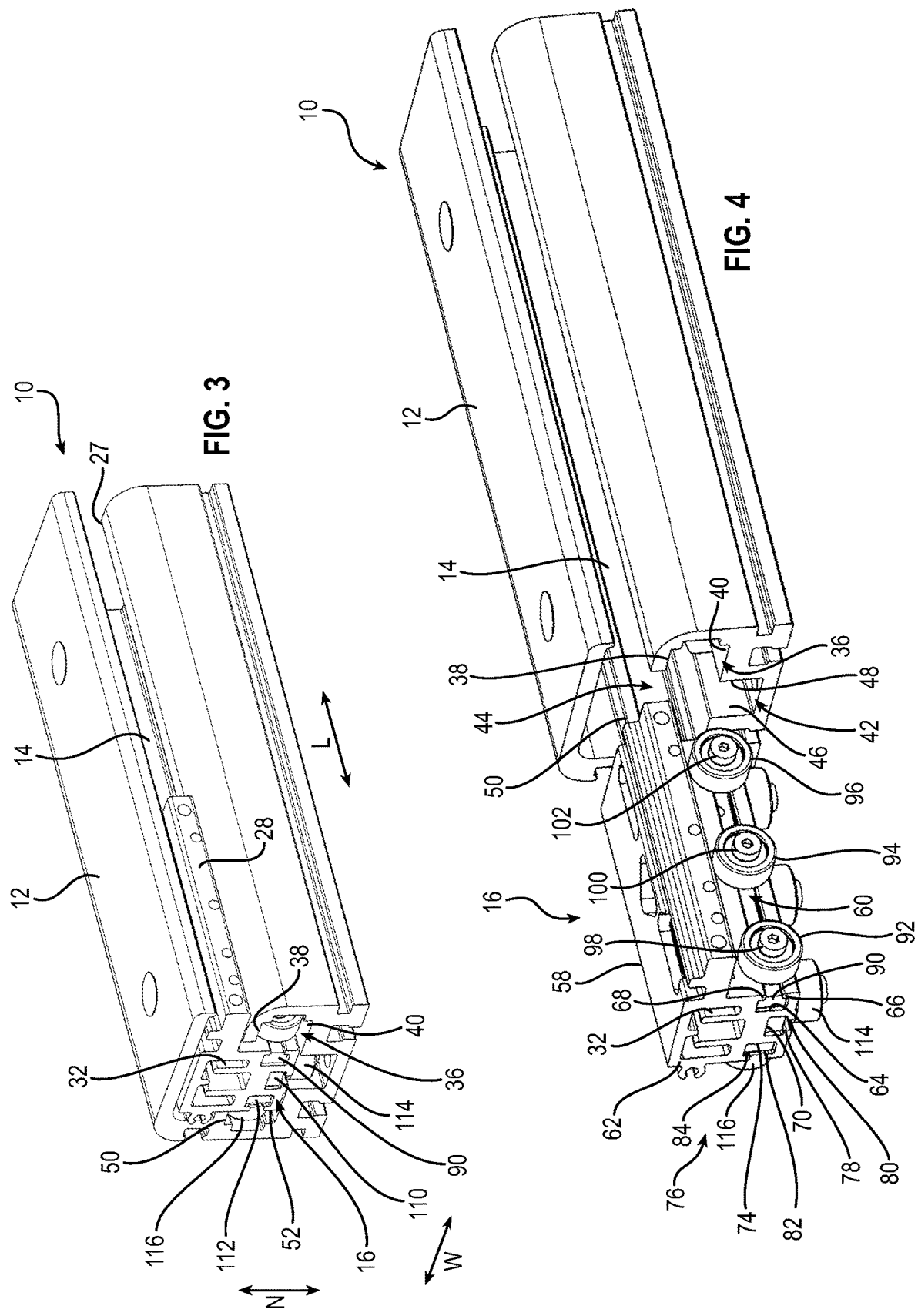

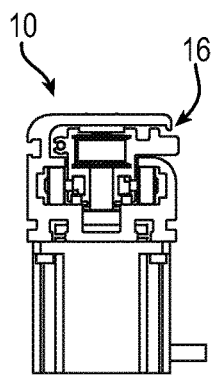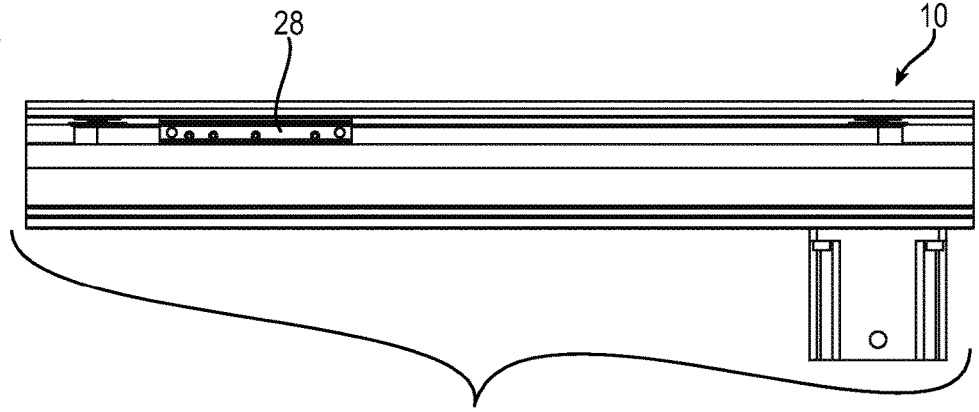
FIG. 5  FIG. 6
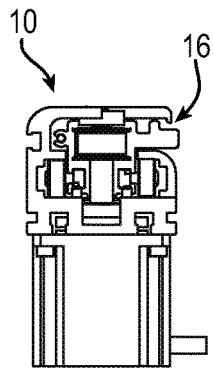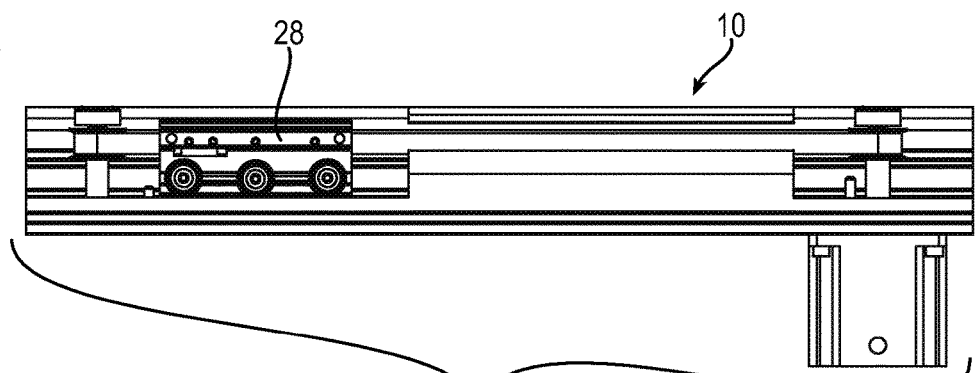
FIG. 7  FIG. 8
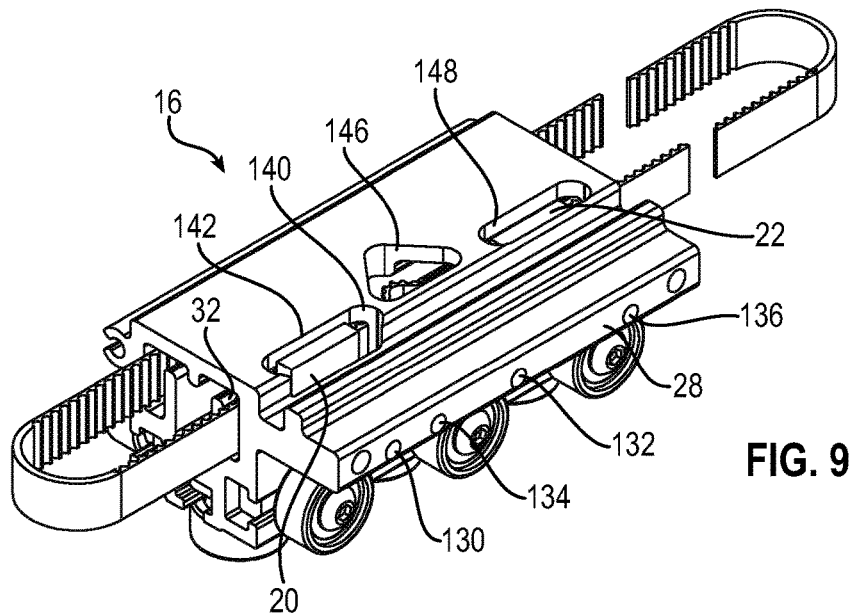
FIG. 9

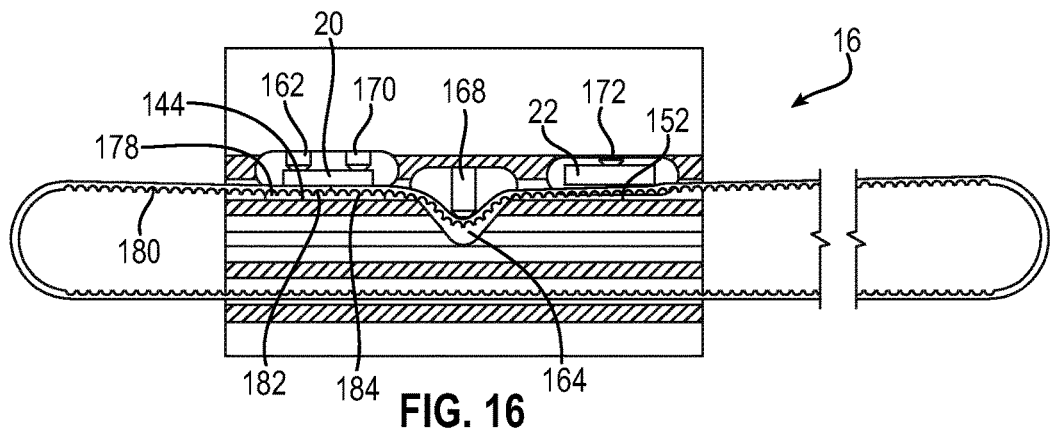
FIG. 16
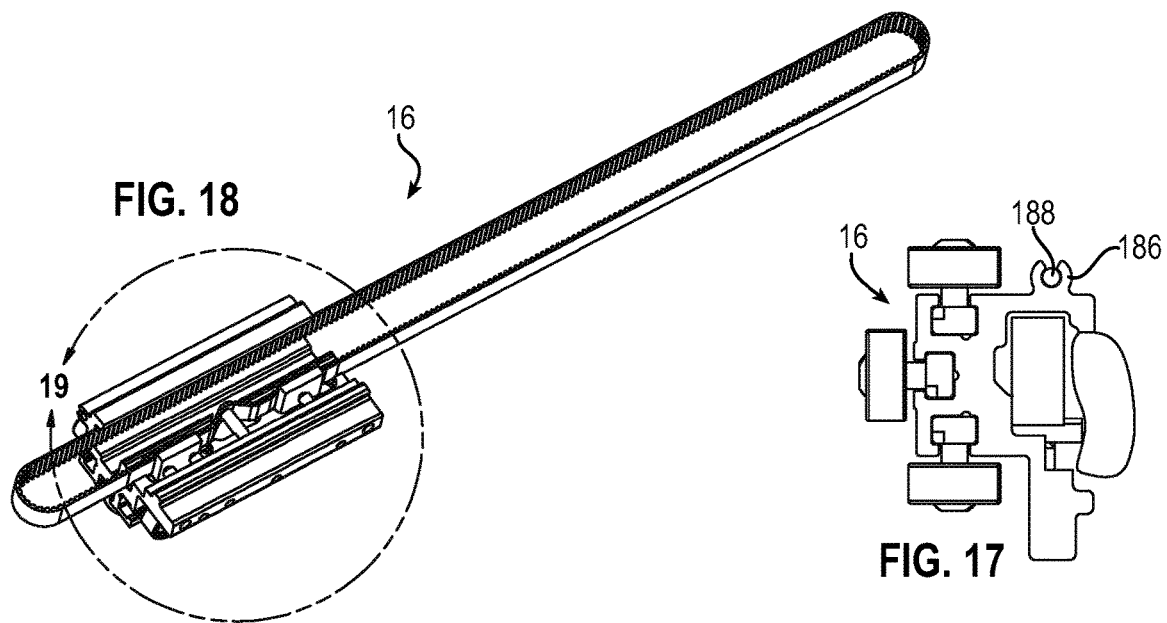
FIG. 18
FIG. 17
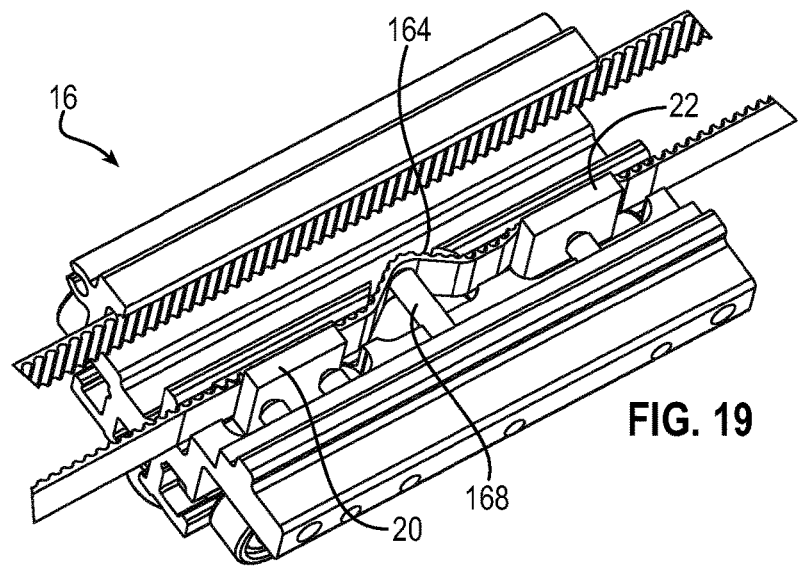
FIG. 19

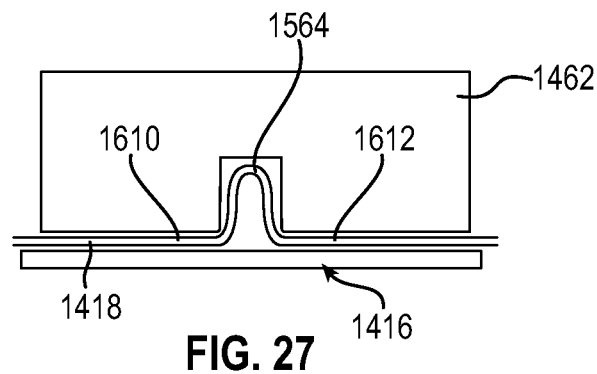
FIG. 27
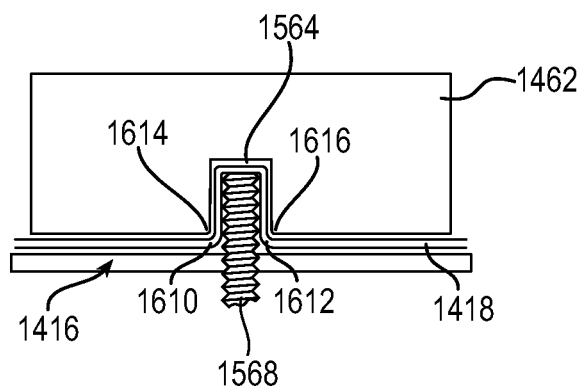
FIG. 28
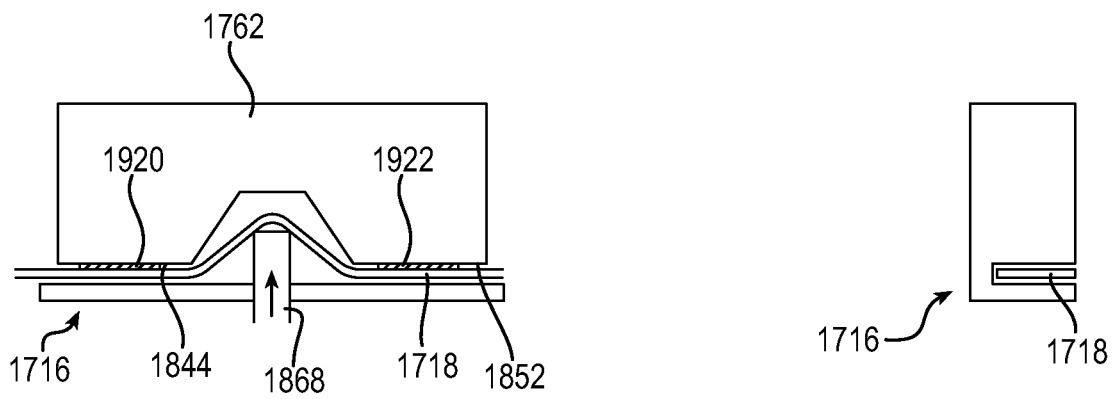
FIG. 29
FIG. 30

BELT TENSIONING METHOD

RELATED APPLICATIONS

This is a divisional of U.S. application Ser. No. 14/891,508 filed on Nov. 16, 2015, which is a national phase of International Application No. PCT/US2014/038627 filed May 19, 2014 and published in the English language, which claims the benefit of U.S. Provisional Application No. 61/824,556 filed May 17, 2013 and U.S. Provisional Application No. 61/879,924 filed Sep. 19, 2013, which are hereby incorporated herein by reference.

FIELD OF INVENTION

The present invention relates generally to linear modules, and more particularly to carriages for linear modules.

BACKGROUND

Linear modules, such as belt driven linear modules, may be provided for construction of machines and handling systems. For example, a belt driven linear module may be provided for materials handling, warehouse use such as parts picking, storage and retrieval, machine tool automation use such as workpiece loading and unloading, testing use such as guiding ultrasonic sensors or laboratory equipment, etc.

The linear module includes a housing having a guideway, a carriage having roller bearing wheels on three sides to provide smooth linear motion and support of the carriage as it moves along the guideway, a drive belt connected to the carriage for providing high speed, high force, and high acceleration movement of the carriage, and a motor for driving the drive belt. The carriage includes a mounting surface, for example for vertical or multi-axis mounting. A suitable component may be coupled to the mounting surface, such as a robot arm, such that linear motion of the carriage effects linear motion of the component.

SUMMARY OF INVENTION

The present invention provides an actuator, preferably a linear actuator, including a carriage having a lateral support surface for supporting a first longitudinal section of a belt against lateral deflection and a space adjacent to and longitudinally offset from the lateral support surface for partially surrounding a second longitudinal section of the belt that is deflected relative to the lateral support surface to take up slack and/or tension the belt. By containing the slack within the carriage using the space and the lateral support surface, slack may be removed from the belt or the belt may be tensioned in an easy and cost efficient manner.

According to one aspect of the invention, a belt driven actuator module including a guide track, a carriage guided by the guide track for longitudinal movement along the guide track, and a belt having a portion thereof attached to the carriage, wherein the carriage has a first lateral support surface for supporting a first longitudinal section of the belt against lateral deflection in a first direction, wherein the belt has a second longitudinal section contiguous with the first longitudinal section, which second longitudinal section is longitudinally offset from the first lateral support surface and is laterally deflected relative to the first lateral support surface in the first direction to take up slack in the belt and/or tension the belt, and wherein the belt is held within the carriage such that the second longitudinal section remains laterally deflected relative to the first lateral support surface.

The actuator module may further include a deflection member adjustable in the first direction within the carriage, the deflection member being positioned to engage the second longitudinal section at a first side of the belt that is opposite a second side of the belt that engages the first lateral support surface at the first longitudinal section, whereby adjustment of the deflection member in the first direction causes the second longitudinal section of the belt to deflect laterally relative to the first longitudinal section of the belt supported by the first lateral support surface for taking up slack in the belt and/or tensioning the belt.

The deflection member may include a plunger.

The deflection member may be positioned to engage the second longitudinal section at a location longitudinally spaced apart from the first lateral support surface.

The carriage may include a clamp for clamping the first longitudinal section of the belt to the first lateral support surface.

The carriage may have a second lateral support surface longitudinally spaced apart from the first lateral support surface for supporting a third longitudinal section of the belt against lateral deflection in the first direction, and the second longitudinal section of the belt is disposed between the first and third longitudinal sections.

The carriage may include first and second clamps for clamping the first and third longitudinal sections of the belt to the first and second lateral support surfaces, respectively.

The first longitudinal section of the belt may have an engaging portion facing in a first direction and engaged with an engaging portion of the first support surface to prevent relative longitudinal movement between the first longitudinal section and the first support surface.

The deflection member may include a plunger that has a belt engaging end face, the belt engaging end face having an intermediate portion disposed between and projecting beyond opposite end portions in the first direction, and wherein the first and second lateral support surfaces have located therebetween a recess in which the belt engaging end face is received, the intermediate portion engaging and laterally deflecting the second longitudinal section of the belt relative to the first lateral support surface in the first direction, and the opposite end portions cooperating with opposing surfaces at the sides of the recess for clamping respective portions of the belt to the opposing surfaces.

The belt may be an endless belt trained around a drive pulley and an idler pulley located at opposite ends of the track.

The spacing between the drive pulley and idler pulley may be not adjustable.

According to another aspect of the invention, a method of tensioning a belt in an actuator module including a guide track, a carriage guided by the guide track for longitudinal movement along the guide track, and a belt having a portion thereof attached to the carriage, the method including laterally supporting a first longitudinal section of the belt against a first lateral support surface in the carriage against lateral deflection in a first direction, while laterally deflecting in the first direction a second longitudinal section of the belt contiguous with the first longitudinal section laterally beyond the first lateral support surface to take up slack in the belt and/or tension the belt, and holding the second longitudinal section laterally deflected relative to the first lateral support surface.

According to yet another aspect of the invention, an actuator carriage including a body extending in a longitudinal direction, a plurality of wheels mounted to the body for rotation around a respective axis extending perpendicular to the longitudinal direction, a longitudinally extending through passage for a belt to extend longitudinally through, a first lateral support surface adjacent the through passage for supporting a first longitudinal section of the belt against lateral deflection in a first lateral direction perpendicular to the longitudinal direction, a clamp moveable in the first direction and guided by the clamp passage for clamping the first longitudinal section of the belt to the first lateral support surface, and a recess facing a second direction opposite the first direction and configured to laterally receive a belt engaging end face of a deflection member, wherein at least a portion of the recess is opposite the through path relative to the belt passage.

The foregoing and other features of the invention are hereinafter described in greater detail with reference to the accompanying drawings.

BRIEF DESCRIPTION OF THE DRAWINGS

FIG. 3 is a perspective view of a section of the exemplary actuator module.

FIG. 4 is a perspective view of the actuator module with a carriage outside of the body.

FIG. 5 is a front view of the actuator module.

FIG. 6 is side view of the actuator module.

FIG. 7 is front view of the actuator module with a portion of the body removed.

FIG. 8 is side view of the actuator module with a portion of the body removed.

FIG. 9 is a perspective view of an exemplary carriage with a belt.

FIG. 16 is a cross-sectional view of the carriage with the belt taken about line 16-16 in FIG. 15.

FIG. 17 is a front view of the carriage with a portion of the top of the carriage removed.

FIG. 18 is a perspective view of the carriage and belt with the top of the carriage removed illustrating a deflection member deflecting the belt and clamps clamping the belt.

FIG. 19 is a perspective view of the carriage and belt with the top of the carriage removed.

FIG. 27 is a top view of still another exemplary carriage assembly with a deflection member.

FIG. 28 is a top view of the carriage assembly of FIG. 27.

FIG. 29 is a top view of yet another exemplary carriage assembly according to the invention.

FIG. 30 is a cross-sectional view of the carriage assembly taken about line 30-30 in FIG. 29.

DETAILED DESCRIPTION

The principles of this present invention have particular application to motion control systems, such as actuator modules for moving a component to multiple locations, and thus will be described below chiefly in this context. It will of course be appreciated, and also understood, that principles of this invention may be applicable to other applications where it is desirable to remove slack in a belt or tension the belt.

Figure 1:
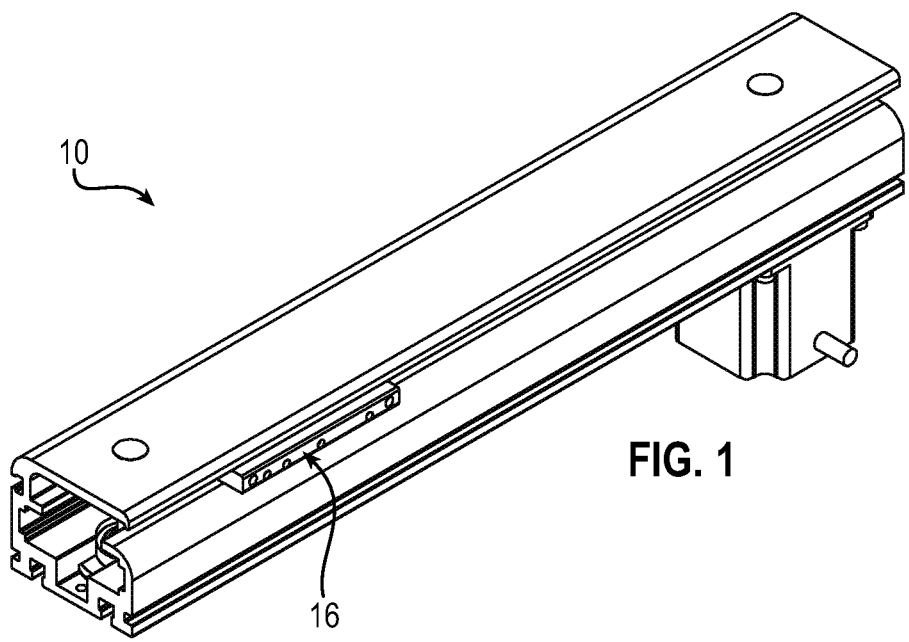
FIG. 1 is a perspective view of an exemplary actuator module according to the invention.
Figure 2:
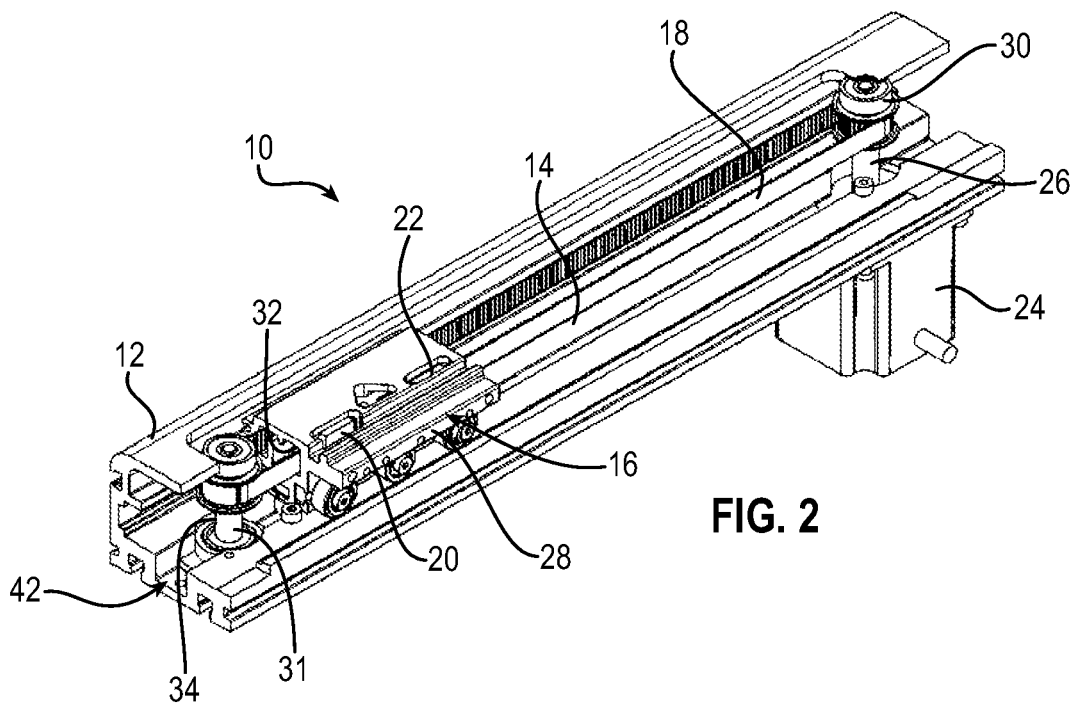
FIG. 2 is a perspective view of the exemplary actuator module with a portion of a body removed.

Referring now in detail to the drawings, and initially to FIGS. 1 and 2, an actuator, such as a linear module provided to shuttle a payload to multiple locations, is designated generally by reference numeral 10. The module includes a track body 12 having a passage 14, a carriage assembly 16 configured to be received in the passage 14, a belt 18 fixed to the carriage assembly 16 by a clamp 20 and/or a clamp 22, and a motor 24 coupled (drivingly connected) to the belt 18 for moving the carriage through the passage 14. The passage 14 may open laterally to an outer portion of the track body 12, for example via a longitudinally extending slot 27 (FIG. 3) extending through the track body 12. A mounting surface 28 of the carriage assembly 16 to which the payload is fixed extends through or is accessible through the slot 27.

The motor 24, which may be any suitable motor, preferably is mounted to the track body 12 and includes a motor shaft 26 having a drive pulley 30 coupled thereto. The belt 18, which may be any suitable belt, such as a reinforced timing belt, is trained around the pulley 30 and extends through a longitudinally extending through passage, herein referred to as a belt passage 32, in the carriage assembly 16 to an idler pulley 31 spaced longitudinally apart from pulley 30. The spacing between the idler pulley 31 and the drive pulley 30 may be adjustable, but is preferably fixed (i.e., not adjustable) to reduce overall weight and assembly cost of the actuator 10. After the carriage assembly 16 has been installed in the track body 12, a pulley assembly 34 can be installed in the track body 12 for the belt to surround. It will be appreciated that the belt 18 may be non-continuous or continuous, otherwise known as endless.

Referring now to FIG. 3, a portion of the track body 12 is shown. The track body 12, which has a length extending in a longitudinal direction L, a width extending in a lateral direction W, and a height extending in a normal direction N perpendicular to the longitudinal and lateral direction, includes at least channel or track 36 at least partially defining the passage 14 and extending in the longitudinal direction. The illustrated track 36 has an upper rail 38 and a lower rail 40 spaced from one another in the normal direction N.

As illustrated in FIGS. 2 and 4, the track body 12 may also include a second channel or track 42 located at any suitable angle, such as ninety degrees from the track 36 and a third channel or track 44 located at any suitable angle, such as ninety degrees from the track 42. The track 44 is laterally aligned with the track 36. The track 42 has a first side rail 46 and a second side rail 48 spaced from one another in the lateral direction, and the track 44 includes an upper rail 50 and a lower rail 52 spaced from one another in the normal direction.

Turning now to FIGS. 3-8, the carriage assembly 16 includes a carriage 58 extending in the longitudinal direction and a wheel bar assembly 60 configured to be fixed to the carriage 58. The carriage 58 includes a body 62, the mounting surface 28 extending laterally from the body 62, the belt passage 32 extending longitudinally through the body 62, and at least one channel 64 extending longitudinally in the body 62. The channel 64 is configured to receive the wheel bar assembly 60 and is partially closed in the lateral direction, for example by projections 66 and 68 projecting in opposite normal directions from the body 62. The projections 66 and 68 extend longitudinally the length of the channel to trap the wheel bar assembly 60 against lateral and normal direction movement.

The carriage 58 may additionally include a second channel 70 extending longitudinally in the body 62 and configured to receive a second wheel bar assembly 72 and a third channel 74 extending longitudinally in the body 62 and configured to receive a third wheel bar assembly 76. The second channel 70 is located at any suitable angle, such as ninety degrees from the channel 64 and the third channel 76 is located at any suitable angle such as ninety degrees from the channel 70 and is laterally aligned with the channel 64. The second channel 70 is partially closed in the normal direction by projections 78 and 80 projecting from the body 62 in opposite lateral directions. The third channel 76 is partially closed in the lateral direction by projections 82 and 84 projecting in opposite normal directions from the body 62. The projections 78, 80, 82, and 84 extend longitudinally the length of the respective channels 70 and 74. The wheel bar assemblies may be any suitable assembly, such as the type described in U.S. Provisional Application No. 61/930,100 filed Jan. 22, 2014, which is hereby incorporated herein by reference.

In an embodiment, the wheel bar assembly 60 includes a deflectable wheel bar 90 extending in the longitudinal direction and a plurality of wheels, and in the illustrated embodiment first, second and third wheels 92, 94, and 96 spaced longitudinally along the deflectable wheel bar 90 and mounted to the wheel bar 90 for rotation around a respective axis 98, 100, and 102 extending in the lateral direction. The deflectable wheel bar 90 is configured to be received in the first channel 64 and be deflectable relative to the carriage 58 in the normal direction when disposed in the channel 64. Clearance is provided for the deflectable wheel bar 90 in the first channel 64 so that the deflectable wheel bar 90 may shift relative to the carriage 58 prior to being fixed to the carriage.

The wheels 92, 94, and 96 may be of any suitable type, such as a radial bearing surrounded by a plastic tread. To mount the wheels 92, 94, and 96 to the wheel bar 90 for rotation, the wheel bar 90 includes first, second and third openings that receive respective first, second and third screws 98, 100, and 102 that serve as axles for the respective wheels 92, 94, and 96. It will be appreciated, however, that the wheels 92, 94 and 96 may be mounted to the wheel bar 90 in any suitable manner, such as by pins projecting from the wheel bar to which the wheels 92, 94, and 96 are mounted.

As best shown in FIGS. 3 and 4, similar to the wheel bar assembly 60, the second and third wheel bar assemblies 72 and 76 each include a respective deflectable wheel bar 110 and 112 extending in the longitudinal direction and a respective plurality of wheels 114 and 116 spaced longitudinally along the respective deflectable wheel bar 110 and 112. The plurality of wheels 114 are mounted to the wheel bar 110 for rotation around a respective axis extending in the lateral direction, and the plurality of wheels 116 are mounted to the wheel bar 112 for rotation around a respective axis extending in the normal direction.

The deflectable wheel bars 110 and 112 are configured to be received in the second and third channels 70 and 74, respectively. The deflectable wheel bar 110 is deflectable relative to the carriage 58 in the lateral direction when disposed in the second channel 70, and the deflectable wheel bar 112 is deflectable relative to the carriage 58 in the normal direction when disposed in the third channel 74. Clearance is provided for the deflectable wheel bars 110 and 112 in the respective channels 70 and 74.

When the carriage 58 is positioned in the passage, the mounting surface 28 of the carriage assembly 16 extends through the slot 27, and a payload may be coupled to the mounting surface. In an embodiment, when the carriage assembly 16 is inserted into the passage, the carriage 58, and therefore the mounting surface 28 may be angled relative to the track body 12 prior to the wheel bar assembly 60 being fixed to the channel 64. For example, before an adhesive, applied to the flexible wheel bar 90 and/or the channel 64, has hardened. Similar to the first wheel bar assembly 60, during assembly of the actuator 10, the carriage assembly 16 may be assembled by inserting the wheel bar assembly 72 into the channel 70 and the wheel bar assembly 76 into the channel 74.

Referring now to FIGS. 3-13, the actuator 10 includes the track body 12, the carriage 58 that is guided by the track body 12 for longitudinal movement along the track body 12, and the belt 18 having a portion thereof attached to the carriage 58. The carriage 58 has one or more lateral support surfaces 144 and 152 for supporting a first longitudinal section of the belt against lateral deflection in a first direction. The belt 18 has a second longitudinal section contiguous with the first longitudinal section and longitudinally offset from each of the lateral support surfaces 144 and 152. The second longitudinal section is laterally deflected relative to the lateral support surfaces 144 and 152 in the first direction to take up slack in the belt 18 and/or tension the belt 18. The belt 18 is held within the carriage 58 such that the second longitudinal section remains laterally deflected relative to the lateral support surfaces 144 and 152.

Illustrated is the belt 18 fixed by a clamp 20 and a clamp 22 to the carriage 58. The clamps 20 and 22 provide a clamping force against the belt 18 and the corresponding lateral support surface 144, 152 to prevent longitudinal movement between the belt 18 and the lateral support surfaces 144 and 152. During assembly a clamp port 140 and a clamp port 148 allow insertion of the clamps 20 and 22 through the clamp ports 140 and 148, respectively, into the carriage 58 to align the clamps 20 and 22 to clamp the belt 18.

Typically the belt 18 will be of the type having a plurality of protrusions for engaging the drive pulley 36, such as ribs, and for engaging a corresponding portion of the belt 18. The lateral support surface 144 may include protrusions for interlocking with the protrusions of the belt 18, such as ribs. The protrusions may be integral with the lateral support surface 144 or may be part of a portion of a separate ribbed belt secured to the lateral support surface 144.

A clamp stop surface 142 and a clamp stop surface 150 are provided to limit movement of the clamps 20 and 22, respectively. Limiting the movement of the clamps 20 and 22 allows limiting the clamping of the belt 18 and preventing over-stressing of the lateral support surfaces 144 and 152.

The carriage assembly 16 includes a first clamp passage 130, a deflection passage 132, a second clamp passage 134, a third clamp passage 136, the first clamp port 140, a deflection port 146, and the second clamp port 148. The clamp passage 130, deflection passage 132, the clamp passage 134 and the clamp passage 136 may each extend laterally through the mounting surface 28 toward the clamp 20. The first and second clamping members 162 and 170 and third clamping member 172 may be provided to laterally force the corresponding clamp 20, 22 against the belt 18 as illustrated in FIGS. 10-13. Also provided is at least one deflection member 168 to laterally force a portion of the belt 18 to deflect and/or tension the belt 18.

Figure 10:
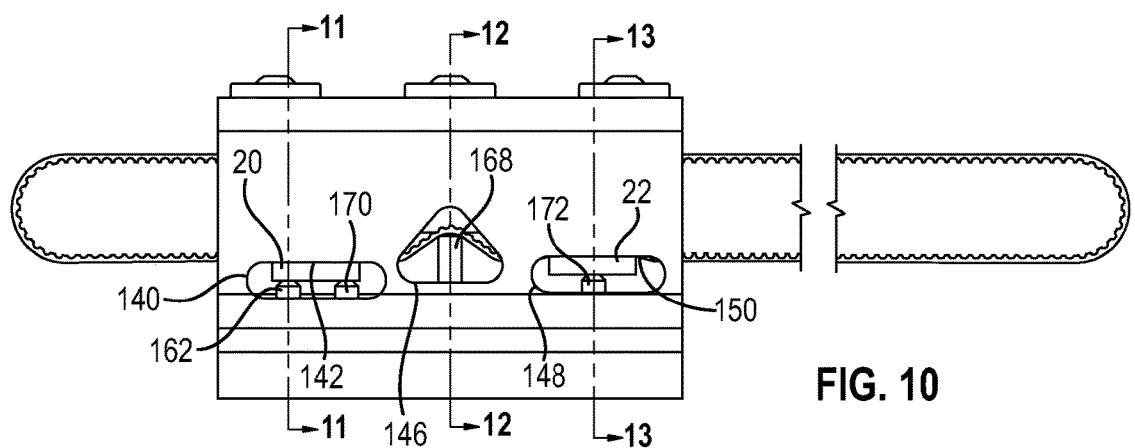
FIG. 10 is a top view of the carriage with the belt.
Figure 11:
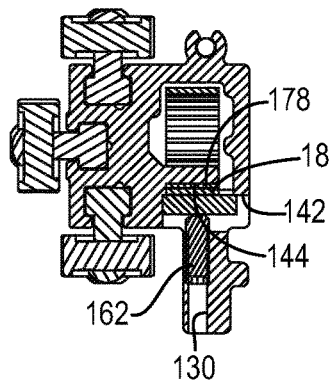
FIG. 11 is a cross-sectional view of the carriage taken about line 11-11 in FIG. 10.

Turning now to FIGS. 10 and 11, the clamping member 162 is shown as a cylindrical extrusion with an end configured to engage the clamp 20 against the belt 18 and an opposite end configured to accept lateral force and/or rotational force about a lateral axis to adjust the amount of force the clamping member 162 exerts on the belt 18 through clamp 20. For example, the clamping member 162 may be a set screw with an outer threaded portion engageable with an inner threaded portion of the clamp passage 130 to translate the set screw laterally when a tool is used to rotate the set screw within the clamp passage 130. In an embodiment, the clamping member may include a piston extending laterally through the clamp passage 130 to apply or adjust clamping pressure against the belt 18. In another embodiment, any suitable clamping device may be used to clamp the clamp 20 against the belt 18 or used to clamp directly against the belt 18. In a still further embodiment, the carriage assembly 16 does not include a clamping member 162.

The clamping member 170 and clamp passage 134 are longitudinally spaced from the clamping member 162 and corresponding clamp passage 130. Similar to the clamping member 162, the clamping member 170 may be a cylindrical extrusion with an end configured to engage the clamp 20 against the belt 18 and an opposite end configured to accept lateral force and/or rotational force about a lateral axis to adjust the amount of force the clamping member 170 exerts on the belt 18 through clamp 20. For example, the clamping member 170 may be a set screw with an outer threaded portion engageable with an inner threaded portion of the clamp passage 134 to translate the set screw laterally when a tool is used to rotate the set screw within the clamp passage 134. In an embodiment, the clamping member may include a piston extending laterally through the clamp passage 134 to apply or adjust clamping pressure against the belt 18. In another embodiment, any suitable clamping device may be used to clamp the clamp 20 against the belt 18 or used to clamp directly against the belt 18. In a still further embodiment, the carriage assembly 16 does not include a clamping member 170 but instead a different holding scheme, such as discussed below.

The clamp port 140 may extend through a top of the body 62 of the carriage 58 to provide access to the clamp 20 and/or to provide a path for the clamp 20 to be assembled into the carriage 58. For example, the clamp port 140 may include an opening, such as an oval-shaped opening, in the top of the body 58 that extends to the belt passage 32.

In an embodiment, the clamp port 140 may include the clamp stop surface 142 laterally spaced from the lateral support surface 144 on the carriage body 62 to limit lateral movement of the clamp 20 toward the lateral support surface 144. In turn a maximum clamping pressure of the clamp 20 against the lateral support surface 144. For example, the clamp 20 may squeeze inward further than the clamp stop surface 142 while the clamp stop surface prevents the clamp 20 from overloading and/or deflecting the lateral support surface 144. The clamp stop surface 142 is spaced from the lateral support surface 144 less than a thickness of the belt 18 and a gripping device 178. In another embodiment, the clamp stop surface 142 is laterally spaced from the lateral support surface 144 less than a thickness of the belt 18. In yet another embodiment, the clamp stop surface 142 is not used to limit clamping of the belt 18.

In some embodiments an outer surface of the body 62 may form the lateral support surface that is engaged by the belt, and the clamp 20 (or clamps 20 and 22) can form with the external surface of the body the herein mentioned belt passage 32.

Figure 12:
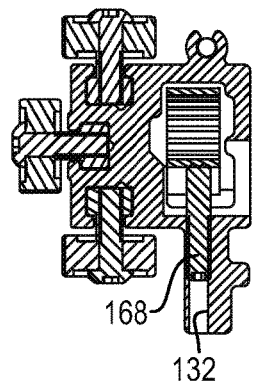
FIG. 12 is a cross-sectional view of the carriage taken about line 12-12 in FIG. 10.

Turning now to FIGS. 10 and 12, the deflection member 168, provided for deflection and/or tensioning of the belt 18, is shown. The deflection member 168 may be a cylindrical extrusion with an end configured to engage the belt 18 and an opposite end configured to accept lateral force and/or rotational force about a lateral axis to adjust the amount of force the deflection member 168 exerts on the belt 18. For example, the deflection member 168 may be a set screw with an outer threaded portion engageable with an inner threaded portion of the deflection passage 132 to translate the set screw laterally when a tool is used to rotate the set screw within the deflection passage 132. The belt may be deflected laterally into a recess 164 laterally offset in the first direction from the lateral support surface 144 and/or the lateral support surface 152.

In an embodiment, the deflection member 168 includes a piston extending laterally through the deflection passage 132 to apply or adjust deflection pressure against the belt 18. In another embodiment, any suitable deflection device is used to deflect and/or tension the belt 18. In yet another embodiment, the deflection member 168 may be removably attached to the carriage 58 to allow deflection of the belt 18 into the recess 164 and later removal of the deflection member 168 from the carriage 58. Once the deflection member 168 is removed, the actuator 10 may operate without the deflection member 168 secured to the carriage 58 to reduce weight of the carriage assembly 16, which reduces shipping weight and energy required by the motor 24 to move the carriage assembly 16. Also, removal of the deflection member 168 allows assembly costs to be reduced because the same deflection member 168 may be re-used to assemble multiple carriage assemblies 16, thereby requiring fewer deflection members 168 than a given number of carriage assemblies 16. In another embodiment, the deflection member 168 may be retracted from a deflected portion of the belt 18 after the belt 18 is secured in place against the carriage 58 to relieve tension force from the belt 18 on the deflection member 168.

The deflection port 146 may extend through a top of the body 62 of the carriage 58 to provide access to the deflection member 168 and/or to provide a path for the deflection member 168 to be assembled into the carriage 58. For example, the deflection port 146 may include an opening, such as a substantially triangular-shaped opening, in the top of the body 58 that extends to the belt passage 32 and/or the recess 164. The deflection port 146 allows access to a deflected portion of the belt 18 through the body 62 of the carriage 58 when the belt 18 is deflected during assembly. In an embodiment, engagement between the deflection member 168 and the belt 18 is visible through the deflection port 146 when the belt 18 is deflected a maximum distance during assembly. In another embodiment, the deflection port 146 includes a laterally facing surface defining a portion of the recess 164 for receiving a portion of the belt 18 when deflected.

Figure 13:
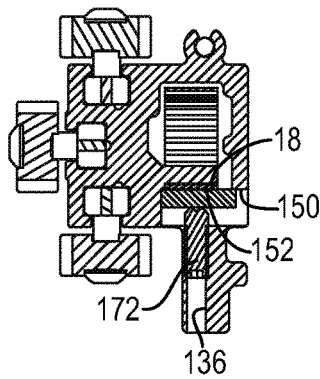
FIG. 13 is a cross-sectional view of the carriage taken about line 13-13 in FIG. 10.
Figure 14:
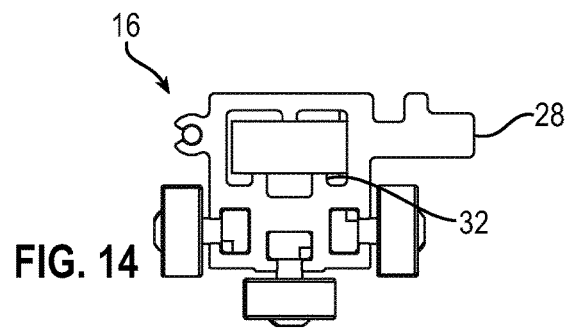
FIG. 14 is a front view of the carriage with the belt.
Figure 15:
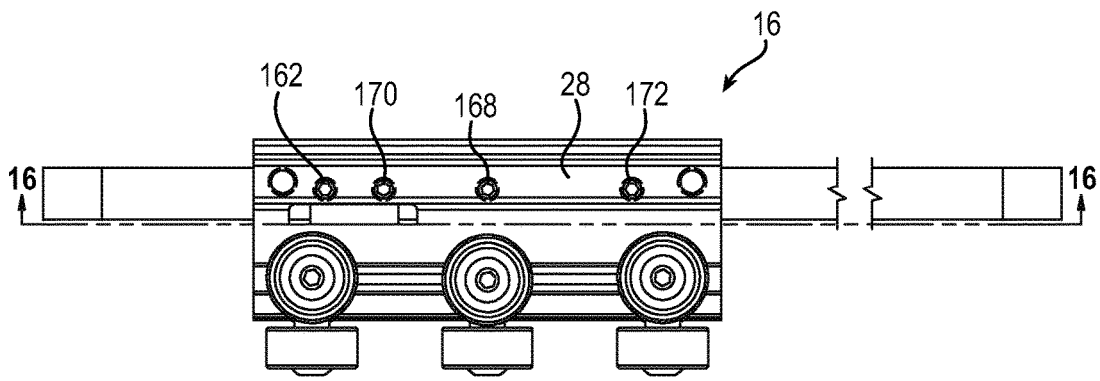
FIG. 15 is a side view of the carriage with the belt.
Figure 20:
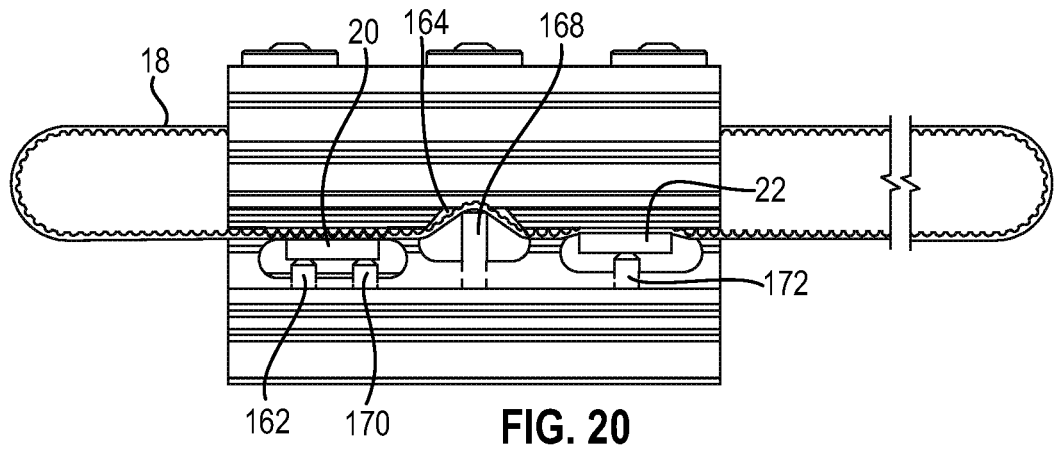
FIG. 20 is a top view of the carriage and belt with the top of the carriage removed.

Turning now to FIGS. 10 and 13, the clamping member 172 and clamp passage 136 are longitudinally spaced opposite the clamp passages 130 relative to the recess 164. The clamping member 172 is shown as a cylindrical extrusion with an end configured to engage the clamp 22 against the belt 18 and an opposite end configured to accept lateral force and/or rotational force about a lateral axis to adjust the amount of force the clamping member 172 exerts on the belt 18 through clamp 22. For example, the clamping member 172 may be a set screw with an outer threaded portion engageable with an inner threaded portion of the clamp passage 136 to translate the set screw laterally when a tool is used to rotate the set screw within the clamp passage 136. In an embodiment, the clamping member 172 includes a piston extending laterally through the clamp passage 136 to apply or adjust clamping pressure against the belt 18. In another embodiment, any suitable clamping device is used to clamp the clamp 20 against the belt 18 or used to clamp directly against the belt 18.

The clamp port 148 may extend through a top of the body 62 of the carriage 58 to provide access to the clamp 22 and/or to provide a path for the clamp 22 to be assembled into the carriage 58. For example, the clamp port 148 may include an opening, such as an oval-shaped opening, in the top of the body 58 that extends to the belt passage 32. In an embodiment, the clamp port 148 includes the clamp stop surface 150 to prevent lateral direction movement of the clamp 22 past a predetermined lateral position relative to the lateral support surface 152. The clamp stop surface 150 is laterally spaced from the lateral support surface 152. Modification of the relative lateral positions of the clamp stop surface 150 and the lateral support surface 152 determines a maximum lateral position of the clamp 20 and allows adjustment of a maximum depression of the clamp 22 against the belt 18 and in turn a maximum clamping pressure of the clamp 22 against the lateral support surface 152. For example, the clamp 22 may squeeze inward further than the clamp stop surface 150 while the clamp stop surface 150 prevents the clamp 22 from overloading and/or deflecting the lateral support surface 152. The clamp stop surface 150 is laterally spaced from the lateral support surface 152 less than the clamp stop surface 142 is spaced from the lateral support surface 144 to allow the clamp 22 to provide similar clamping force on the belt 18 as the clamp 20. The clamp stop surface 150 is spaced less than a thickness of the belt 18 from the lateral support surface 152. In another embodiment, the clamp stop surface 150 is laterally spaced from the lateral support surface 152 less than a thickness of the belt 18 and gripping device (not shown) similar to gripping device 178. In yet another embodiment, the clamp stop surface 150 is not used to limit clamping of the belt 18.

As best shown in FIG. 11, a gripping device 178 is provided between the belt 18 and the lateral support surface 144, allowing the clamp stop surface 142 of the clamp port 140 to be laterally spaced further away from the lateral support surface 144 of the body 62 and provide sufficient clamping force compared to clamp 22 against clamp stop surface 150. The gripping device 178 may include an engaging portion facing in a first direction parallel to the lateral direction shown in FIG. 3. For example, the gripping device 178 may be formed from a section of the belt 18 or another belt with a gripping device facing a second direction opposite the first direction and configured to engage a gripping device 180 of the belt 18. The engagement between the gripping devices 178 and 180 allows for enhanced engagement between the belt 18 and the carriage 58 to prevent longitudinal movement between a first longitudinal section of the belt 18 and the lateral support surface 144.

The clamp 22 is not illustrated with a corresponding gripping device attached to the lateral support surface 152. The gripping device 178 and the belt 18 are between the clamp 20 and the lateral support surface 144, while no gripping device is provided between the clamp 22 and the lateral support surface 152. In an embodiment, a gripping device is between the clamp 22 and the lateral support surface 152. The clamp stop surface 142 is laterally spaced from the lateral support surface 144 further than the clamp stop 150 is spaced from the lateral support surface 152. The lateral offset of the clamp stop surface 142 and clamp stop surface 150 allows the clamp 20 to provide a clamping force equal to the clamping force of clamp 22 when each clamp 20, 22 abuts its corresponding clamp stop surface 142, 150. In another embodiment, the clamp stop surface 142 and the clamp stop surface 150 are laterally spaced to allow the clamp 20 and the clamp 22 to provide different clamping forces to the belt 18. In yet another embodiment, the belt 18 includes the gripping portion 180, which may include an engaging portion for engaging the gripping device 178 fixed to the lateral support surface 144 to help prevent longitudinal movement between the belt 18 and the carriage 58.

Referring now to FIGS. 14-20, the carriage assembly 16 includes the belt 18, which is non-continuous and includes a belt end 182 and an opposite belt end 184. The belt ends 182 and 184 may be abutted against one another and engaged with the gripping device 178 to prevent relative longitudinal movement between the belt ends 182 and 184. In an embodiment, the belt ends 182 and 184 are clamped against lateral support surface 144 without the gripping device 178. Varying the relative position of the belt ends 182 and 184 allows the length of the belt 18 to be adjusted during assembly of the carriage assembly 16. For example, the belt ends 182 and 184 may be longitudinally spaced apart and engaged with the gripping device 178 to secure the belt ends 182 and 184 and the belt 18 when the clamp 20 clamps against the belt 18. The clamping member 162 and the clamping member 170 are longitudinally spaced to apply force on the belt 18 on either side of the belt ends 182, 184 to distribute force on both belt ends 182 and 184.

In an embodiment, the first longitudinal section of the belt 18 includes a splice that engages the belt ends 182 and 184 and the gripping device 178 to prevent the belt ends 182 and 184 from pulling away from one another. Engaging the belt ends 182 and 184 with the gripping device 178 may form a third longitudinal section of the belt 18 that is thicker than the first or second longitudinal sections because part of the thickness of gripping device 178 may be combined with part of the thickness of the belt 18. To prevent over clamping, the clamp stop surface 142 may be laterally recessed from the clamp stop surface 150 based on the additional thickness of the engaged gripping device 178 and belt 18. In yet another embodiment, each lateral support surface 144, 152 and the corresponding gripping device 178 may form one-piece or the gripping device 178 may be machined from the lateral support surface 144 and/or the lateral support surface 152.

Turning now to FIG. 17, the carriage assembly 16 may also include a positioning magnet support 186 laterally extending from a side of the carriage 58. The positioning magnet support 186 may include a partially annular portion configured to secure a positioning magnet 188 to fix the positioning magnet 188 to the carriage 58. The positioning magnet 188 secured to the carriage 58 allows the position of the carriage 58 within the carriage assembly 16 to be determined by sensing the positioning magnet 188. It will be appreciated that other suitable positioning sensors may be used to determine a position of the carriage, and the position of the carriage 58 may be measured directly based on an absolute position of the carriage 58 or indirectly based on rotations of the motor 24 or pulley 30.

During tensioning of the belt 18, the carriage 16 is inserted into the track body 12 and the belt 18 is inserted into the belt passage 32. The belt 18 can be installed on the pulley 30 and the idler pulley 31 without a need to adjust the spacing between the pulley 30 and the idler pulley 31. Once the belt 18 is installed, the belt 18 may be tensioned using the deflection member 168 and secured using various combinations of the clamps 20 and 22 and the deflection member 168. The deflection member 168 engages the belt 18 prior to the second of either clamp 20 or clamp 22 engaging the belt 18 and the carriage 58. Clamp 20 secures belt ends 182 and 184, then deflection member 168 is advanced laterally to reduce slack in the belt 18, and then the clamp 22 engages the belt 18. In an embodiment, the belt 18 is continuous and the deflection member 168 may engage the belt 18 before either of clamps 20 and/or 22 secure the belt 18. During operation motor 24 rotates the belt 18, which in turn moves the carriage 58 to a desired position. Laterally advancing one or more of the clamping member 162 toward and engaging clamp 20, clamping member 170 toward and engaging clamp 20, and/or clamping member 172 toward and engaging clamp 22 secures the belt 18 to the carriage 58, thereby allowing longitudinal movement of the belt 18 to translate the carriage 58. For example, one or more of clamping members 162 and 170 laterally advance toward clamp 20, before or after the deflection member 168 laterally advances, to engage a first portion of the belt 18.

Each belt end 182 and 184 is aligned with the lateral support surface 144 and the clamp is inserted through clamp port 140 to secure the belt ends 182 and 184 from pulling apart from one another. The clamps 20 and 22 hold the belt 18 in combination with one another or individually in combination with the deflection member 168. Alternatively, the belt 18 may be a continuous belt or belt ends 182 and 184 may be aligned with lateral support surface 152 to allow the deflection member 168 and clamp 22 to hold the belt 18 in tension or to allow the clamp 20 to engage the belt 18 after the deflection member 168 deflects the belt 18.

Prior to the second of the clamp 20 or the clamp 22 engaging the belt 18, the deflection member 168 is laterally advanced toward the belt 18 to deflect and/or tension the belt 18, thereby tensioning the belt 18 and preventing slippage of the belt 18 against the pulley 30 to more efficiently transfer rotational force from the motor 24. The deflection member 168 may secure a second portion of the belt 18, for example by tightening a set screw of the deflection member 168 within the deflection passage 132. Securing the belt 18 with the clamp 20 and the deflection member 168 allows the clamp 20 and the deflection member 168 to hold the second longitudinal section laterally deflected relative to the lateral support surface 144, thereby tensioning and securing the belt 18 without engaging the clamp 22. Advancing the clamping member 172 laterally toward the clamp 22 secures the belt 18 to the carriage 58, thereby preventing slack in a second portion of the belt 18 between the clamps 20 and 22 from reducing tension in the rest of the belt 18 and allowing the deflection member to be laterally retracted.

Thus, the deflection member 168 may then be slightly or completely retracted to reduce force from the belt 18 on the deflection member 168 and the belt 18 may still be held in a deflected position relative to the lateral support surface 144 and/or the lateral support surface 152. For example, the deflection member 168 may be part of a separate and/or external device that deflects the belt 18 and retracts from the belt 18 after the belt 18 is clamped. Retracting the deflection member 168, even slightly, allows reduced wear on the deflection member 168 by reducing force and can lower assembly costs by reusing the deflection member 168 on another assembly by removing the deflection member 168 completely from the carriage 58 after assembly of the carriage assembly 16. Removal of the deflection member 168 allows reduced assembly weight and costs of the carriage assembly 16 and in turn reduced weight and cost of the actuator 10.

Figure 21:
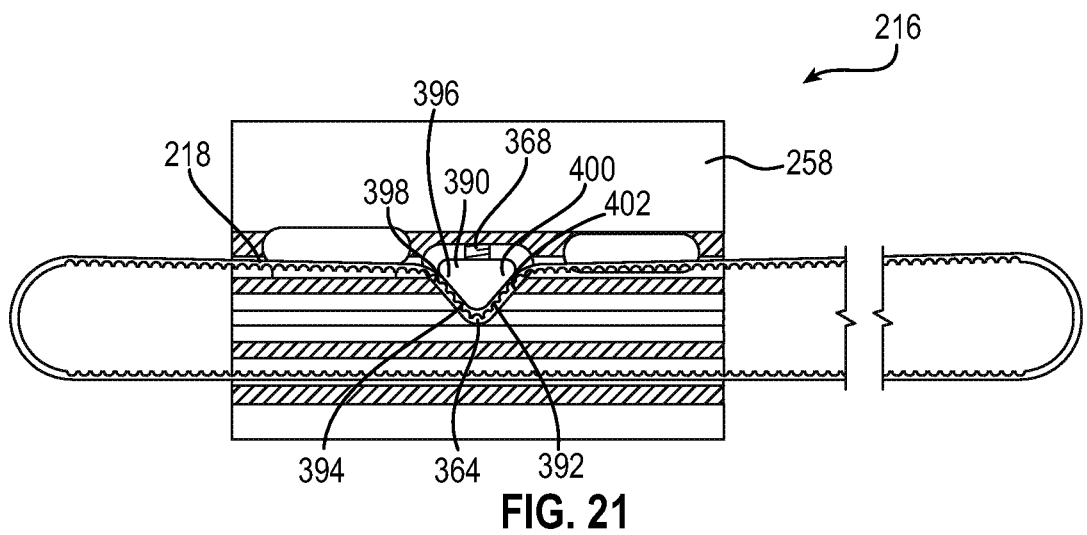
FIG. 21 is a cross-sectional view of another exemplary carriage showing a belt being tensioned according to the invention.

Turning now to FIG. 21, an exemplary embodiment of the carriage assembly is shown at 216. The carriage assembly 216 is substantially the same as the above-referenced carriage assembly 16, and consequently the same reference numerals but indexed by 200 are used to denote structures corresponding to similar structures in the carriage assembly 16. In addition, the foregoing description of the carriage assembly 16 is equally applicable to the carriage assembly 216 except as noted below. Moreover, it will be appreciated upon reading and understanding the specification that aspects of the carriage assemblies may be substituted for one another or used in conjunction with one another where applicable.

The carriage assembly 216 includes a deflection member 368 having a plunger 390 with a belt engaging end face 392 at a lateral end of the deflection member 368 for engaging the belt 218. The plunger may move linearly, rotationally, or in any suitable manner to engage the belt 218. During engagement of the belt 218, the plunger 390 may deflect and/or tension the belt 218. Toward the end of assembly, the plunger piece laterally deflects the belt 218 into the recess 364 until the belt 218 is suitably deflected end/or tensioned. The belt engaging end face 392 may have an intermediate portion 394 extending laterally away from the deflection member 368 in a first direction for engaging the belt 218 and extending into recess 364. In an embodiment, the belt engaging end face 392 includes an end portion 396 for engaging the belt 218 against a lateral plunger support surface 398. The belt engaging end face 392 may include an end portion 400 opposite the end portion 396 for engaging the belt 218 against a lateral plunger support surface 402. The intermediate portion 394 may project beyond the end portions 396, 400 in the first direction to further deflect and/or tension the belt 18. The end portions 396, 400 may extend longitudinally away from the intermediate portion 394 to form a triangular shape.

The lateral plunger support surfaces 398, 402 define a portion of the recess 364 and allow the belt 218 to be clamped and held in place relative to the carriage 258. The lateral plunger support surfaces 398, 402 are longitudinally spaced to engage corresponding end portions 396, 400 and to allow the intermediate portion 394 to be received in the recess 364. Thus, the carriage assembly 216 may deflect and/or tension the belt 218 and may hold the belt 218 in place against the carriage 258 without needing a clamp or clamping member because the plunger piece 390 also acts as a clamp.

Figure 22:
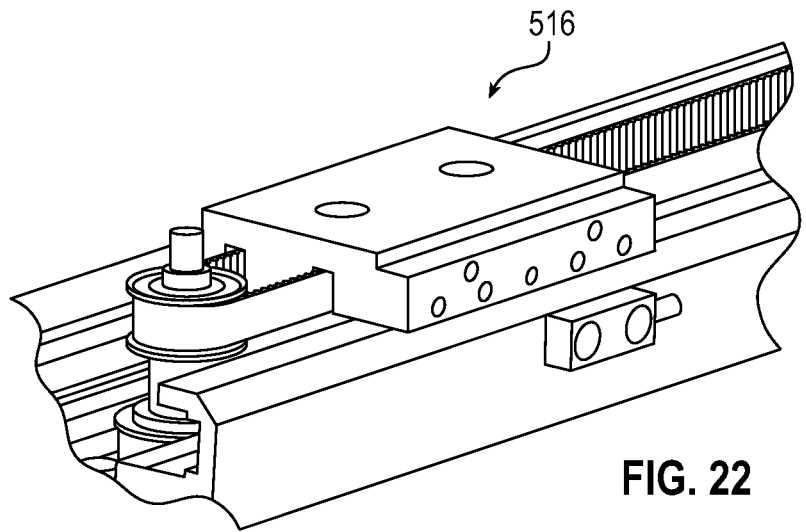
FIG. 22 is a perspective view of yet another exemplary actuator module including a carriage according to the invention.
Figure 23:
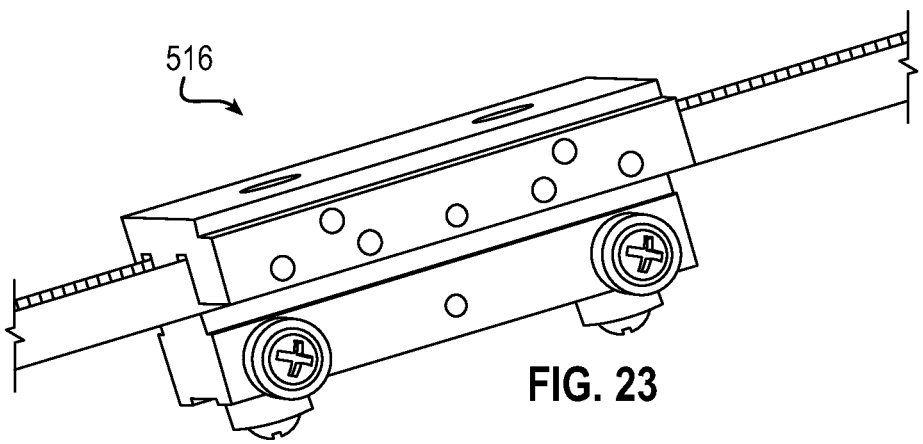
FIG. 23 is perspective view of the carriage of the FIG. 22.
Figure 24:
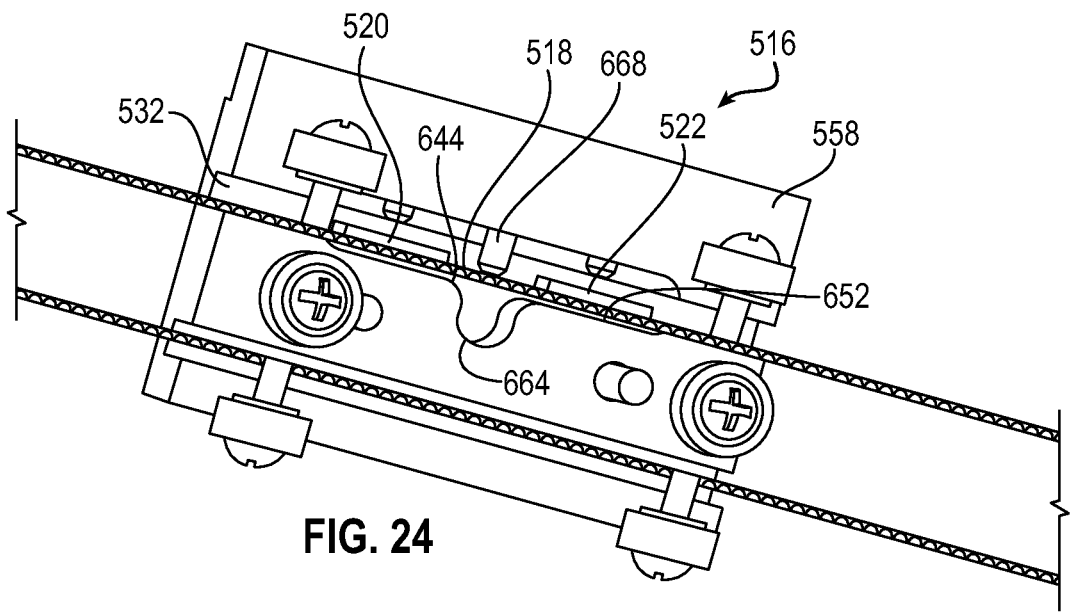
FIG. 24 is another perspective view of the carriage of FIG. 22 illustrating a recess and an undeflected belt.

Turning now to FIGS. 22-24, an exemplary embodiment of the carriage assembly is shown at 516. The carriage assembly 516 is substantially the same as the above-referenced carriage assembly 16, and consequently the same reference numerals but indexed by 300 are used to denote structures corresponding to similar structures in the carriage assembly 16, 216. In addition, the foregoing description of the carriage assembly 16, 216 is equally applicable to the carriage assembly 516 except as noted below. Moreover, it will be appreciated upon reading and understanding the specification that aspects of the carriage assemblies may be substituted for one another or used in conjunction with one another where applicable.

The carriage assembly 516 includes a recess 664 defined by a contiguous portion of the carriage 558 that forms a lateral support surface 644 longitudinally spaced from lateral support surface 652. The recess 664 may form a pocket longitudinally between the lateral support surfaces 644 and 652 for receiving the belt 518 when the deflection member 668 laterally deflects and/or tensions the belt 518. The lateral support surfaces 644 and 652 may include a corresponding rounded portion that transitions to the recess 664 that is at least partially coplanar with the lateral support surfaces 644 and 652. Each of the lateral support surfaces 644 and 652 and the recess 664 allows the deflection member 668 to laterally extend toward and engage a lateral end portion of the recess 664 of the body 558 with a portion of the belt 518 therebetween. Engaging the belt 518 between the deflection member 668 and the recess 664 in the body 558 allows the belt 518 to be secured without a clamp.

A clamp 520 and a clamp 522 may be inserted from beneath the carriage 558 adjacent the belt passage 532 and corresponding portions of the belt 518 engage the clamps 520 and 522 against the belt 518 to retain suitable tension in the belt 518. Similar to clamps 20 and 22 of carriage assembly 16 described above, clamps 520 and 522 may be engaged in conjunction with the deflection member 668 either separately or in unison with one another to deflect the belt 518 and hold the belt 518 in a deflected state. Additionally, the clamps 520 and 522 are able to hold the belt 518 in a deflected state, thereby allowing the deflection member 668 to be partially retracted to reduce wear on the deflection member 668 or completely retracted to reduce force on and reuse the deflection member 668. In an embodiment, the deflection member 668 is external and not part of a stage used to tension the belt 518.

Turning now to FIGS. 25-32, exemplary embodiments of the carriage assembly are shown at 816, 1116, 1416, 1716, and 2016. The carriage assemblies 816, 1116, 1416, 1716, and 2016 are substantially the same as the above-referenced carriage assembly 16, and consequently the same reference numerals but indexed by 800, 1100, 1400, 1700, and 2000 respectively are used to denote structures corresponding to similar structures in the carriage assemblies. In addition, the foregoing description of the carriage assemblies 16, 216, 516 are equally applicable to the carriage assemblies except as noted below. Moreover, it will be appreciated upon reading and understanding the specification that aspects of the carriage assemblies may be substituted for one another or used in conjunction with one another where applicable.

Figure 25:
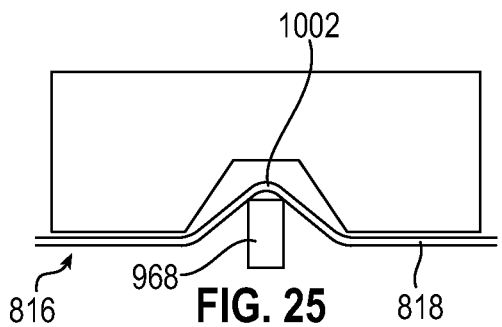
FIG. 25 is a top view of an exemplary carriage assembly according to the invention.
Figure 26:
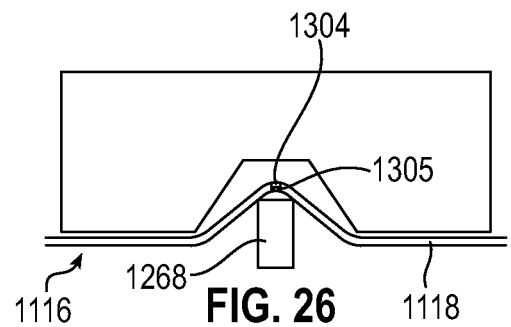
FIG. 26 is a top view of another exemplary carriage assembly according to the invention.

Referring now to FIGS. 25 and 26, the belt 818, 1118 and the deflection member 968, 1268 may be fixed to one another respectively as illustrated. FIG. 25 illustrates an adhesive 1002 applied between the deflection member 968 and the belt 818 to prevent relative movement between the belt 918 and the deflection member 968.

FIG. 26 illustrates an engagement device 1304 on the belt 1118 for engaging the belt 1118 to the deflection member 1268 to prevent relative longitudinal movement between the deflection member 1268 and the belt 1118. The engagement device 1304 may be a hole in the belt configured to secure the belt 1118 to a protrusion 1305 in the deflection member 1268 against relative longitudinal movement. Alternatively, the engagement device 1304 may be a protrusion on the belt 1118 configured to engage in a recess on the deflection member 1268.

Referring now to FIGS. 27 and 28, a carriage assembly 1416 includes a body 1462, a belt 1418, and a deflection member 1568 for deflecting the belt 1418. The belt 1418 may include a locking portion 1610 and a locking portion 1612 for locking the belt 1418 against corresponding laterally facing corners 1614 and 1616 of the body 1462 when the deflection member engages the belt 1418. The laterally facing corners 1614 and 1616 may be spaced apart based on a thickness of the belt 1418 and the deflection member 1568 to engage the belt 1418 against the deflection member 1568 as the deflection member 1568 advances into a recess 1564 of the body 1462. The deflection member 1568 may be threaded to threadably connect to a threaded portion of the body 1462. As the deflection member 1568 advances against the belt 1418 the locking portions 1610 and 1612 engage the laterally facing corners 1614 and 1616 to lock the belt 1418 between the laterally facing corners 1614 and 1616 and the deflection member 1568. Locking the belt 1418 allows the belt 1418 to be secured in the recess 1564 of the body 1462 without using additional clamps.

Referring now to FIGS. 29 and 30, a carriage assembly 1716 includes a belt 1718, a deflecting member 1868, a body 1762, a lateral support surface 1844, a lateral support surface 1852, an adhesive 1920, and an adhesive 1922. The adhesives may be applied to corresponding portions of the belt 1718 and lateral support surfaces 1844 and 1852 to secure the belt 1718 to the body 1762. For example, the adhesives 1920 and 1922 may be applied to one or both of the lateral support surfaces 1844 and 1852 before and/or after the belt 1718 is tensioned by the deflection member 1868. After tensioning, the adhesives 1920 and 1922 secure the belt 1718 to the body 1762. The deflection member 1868 may optionally be retracted without using a clamp to secure the belt 1718.

Figure 31:
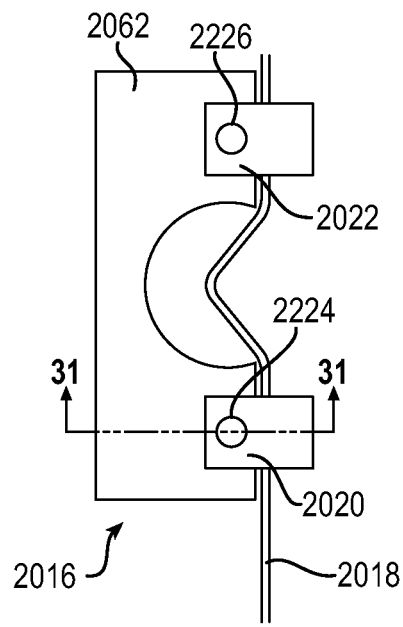
FIG. 31 is a top view of a further exemplary carriage assembly according to the invention.
Figure 32:
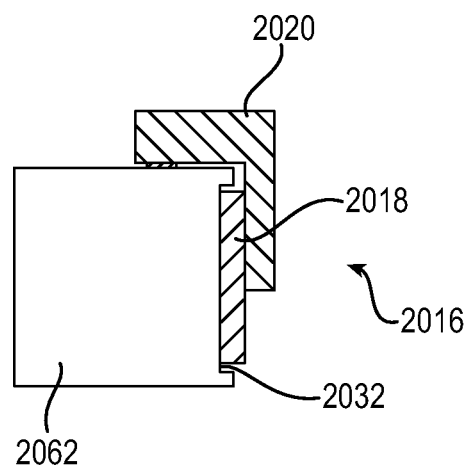
FIG. 32 is a cross-sectional view of the carriage assembly taken about line 32-32 in FIG. 31.

Referring now to FIGS. 31 and 32, a carriage assembly 2016 includes a belt 2018, a clamp 2020, a clamp 2022, a belt passage 2032, a body 2062, a securing member 2224, and a securing member 2226. The clamps 2020 and 2022 are secured to the body 2062 by corresponding securing members 2224 and 2226. For example, the securing members 2224 and 2226 may be fasteners, such as screws, configured to secure the clamps 2020 and 2022 against the belt 2018 and the body 2062. The belt 2018 extends along the belt passage 2032 and is secured within the belt passage 2032 by the clamp 2020 and/or the clamp 2022. The clamps 2020 and 2022 may be configured to laterally adjust until the corresponding securing member 2224, 2226 is engaged. The clamps 2020 and 2022 may be fixed in position with a space between the body less than a thickness of the belt 2018 to allow the clamps 2224 and 2226 to clip the belt 2018 in place after the belt 2018 is positioned between the clamps 2224 and 2226 and the body 2062.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of tensioning a belt in an actuator module including a guide track, a carriage guided by the guide track for longitudinal movement along the guide track, and the belt having a portion thereof attached to the carriage, the method including:
   laterally supporting a first longitudinal section of the belt against a first lateral support surface in the carriage against lateral deflection in a first direction, while laterally deflecting in the first direction a second longitudinal section of the belt contiguous with the first longitudinal section laterally beyond the first lateral support surface to take up slack in the belt and/or tension the belt, wherein a deflection member is used to deflect the second longitudinal section laterally; and
   holding the second longitudinal section laterally deflected relative to the first lateral support surface, wherein the holding step includes holding the belt with a first clamp against the first lateral support surface, and wherein the holding step includes holding the belt with a second clamp against a second lateral support surface longitudinally spaced apart from the first lateral support surface, with the second longitudinal section being located longitudinally between the first and second lateral support surfaces, and wherein the first and second clamps are located laterally opposite the first and second lateral support surfaces, respectively, for laterally applying a clamping force on the belt between first and second clamps and the first and second lateral support surfaces, respectively.

2. The method of claim 1, wherein the deflection member is used to hold the second longitudinal section laterally deflected relative to the first lateral support surface.

3. The method of claim 1, wherein the deflection member is first used to deflect the belt laterally and then removed after the holding step is performed.

4. The method of claim 1, wherein the deflecting step is prior to holding the belt with the second clamp.

5. The method of claim 1, further including moving the first clamp with a first clamping member in the first direction toward the first lateral support surface to hold the belt.

6. The method of claim 5, wherein the first clamping member moves the first clamp in the first direction before the second longitudinal section of belt is deflected laterally in the first direction.

7. The method of claim 5, wherein the first clamping member moves the first clamp in the first direction after the second longitudinal section of belt is deflected laterally in the first direction.

8. The method of claim 5, further including moving the second clamp with a second clamping member in the first direction toward the second lateral support surface to hold the belt.

9. The method of claim 8, wherein the second clamping member moves the second clamp in the first direction after the second longitudinal section of belt is deflected laterally in the first direction.

10. The method of claim 8, wherein the first and second clamping members are fasteners.

11. The method of claim 8, wherein set screws are used as the fasteners.

12. The method of claim 1, wherein the first clamp has a first belt engaging surface that is parallel to the first lateral support surface, and the second clamp has a second belt engaging surface that is parallel to the second lateral support surface.

13. The method of claim 12, wherein the first and second lateral support surfaces are coplanar.

14. The method of claim 1, wherein the first and second lateral support surfaces are coplanar.

15. The method of claim 1, wherein a plunger is used as the deflection member.

16. The method of claim 15, wherein a set screw is used as the plunger, and the set screw is threadedly engaged in a threaded bore in the carriage.

17. The method of claim 16, wherein the first clamp is moved laterally to clamp the belt against the first lateral support surface.

18. The method of claim 1, wherein at least one of the first and second clamps is moved laterally to clamp the belt against the respective lateral support surface.

19. A method of tensioning a belt in an actuator module including a guide track, a carriage guided by the guide track for longitudinal movement along the guide track, and the belt having a portion thereof attached to the carriage, the method including:
   laterally supporting a first longitudinal section of the belt against a first lateral support surface in the carriage against lateral deflection in a first direction, while laterally deflecting in the first direction a second longitudinal section of the belt contiguous with the first longitudinal section laterally beyond the first lateral support surface to take up slack in the belt and/or tension the belt, wherein a deflection member is used to deflect the second longitudinal section laterally; and
   holding the second longitudinal section laterally deflected relative to the first lateral support surface, wherein the holding step includes holding the belt with a first clamp against the first lateral support surface, and wherein the holding step includes holding the belt against a second lateral support surface longitudinally spaced apart from the first lateral support surface, with the second longitudinal section being located longitudinally between the first and second lateral support surfaces, and wherein the first clamp is located laterally opposite the first lateral support surface for laterally applying a clamping force on the belt between first clamps and the first lateral support surface.

* * * * *